(12) United States Patent
Casimir et al.

(10) Patent No.: US 10,110,016 B2
(45) Date of Patent: Oct. 23, 2018

(54) ELECTRICAL CONVERSION AND DISTRIBUTION SYSTEM FOR AN AIRCRAFT

(71) Applicant: Safran Electrical & Power, Blagnac (FR)

(72) Inventors: Roland Casimir, Blagnac (FR); Vincent Giorgis, Blagnac (FR); Eric de Wergifosse, Blagnac (FR)

(73) Assignee: Safran Electrical & Power, Blagnac (FR)

( * ) Notice: Subject to any disclaimer, the term of this patent is extended or adjusted under 35 U.S.C. 154(b) by 267 days.

(21) Appl. No.: 15/115,182

(22) PCT Filed: Jan. 28, 2015

(86) PCT No.: PCT/FR2015/050196
§ 371 (c)(1),
(2) Date: Jul. 28, 2016

(87) PCT Pub. No.: WO2015/114252
PCT Pub. Date: Aug. 6, 2015

(65) Prior Publication Data
US 2016/0380437 A1    Dec. 29, 2016

(30) Foreign Application Priority Data
Jan. 31, 2014   (FR) ...................................... 14 50791

(51) Int. Cl.
| | |
|---|---|
| *B64D 41/00* | (2006.01) |
| *H02J 3/46* | (2006.01) |
| *H02M 7/06* | (2006.01) |
| *H02M 7/217* | (2006.01) |
| *H02M 7/537* | (2006.01) |

(Continued)

(52) U.S. Cl.
CPC ................ *H02J 5/00* (2013.01); *B64D 41/00* (2013.01); *H02J 3/46* (2013.01); *H02J 7/02* (2013.01); *H02J 7/1415* (2013.01); *H02J 7/1492* (2013.01); *H02M 7/06* (2013.01); *H02M 7/217* (2013.01); *H02M 7/537* (2013.01);

(Continued)

(58) Field of Classification Search
None
See application file for complete search history.

(56) References Cited

U.S. PATENT DOCUMENTS

| | | | | |
|---|---|---|---|---|
| 6,018,233 A | * | 1/2000 | Glennon | ................. F02N 11/04 290/36 R |
| 2013/0182467 A1 | * | 7/2013 | Cross | ........................ H02J 3/36 363/35 |

FOREIGN PATENT DOCUMENTS

| | | |
|---|---|---|
| EP | 1 792 379 B1 | 6/2007 |
| FR | 2 907 762 A1 | 5/2008 |

(Continued)

*Primary Examiner* — Jared Fureman
*Assistant Examiner* — Aqeel Bukhari
(74) *Attorney, Agent, or Firm* — Blank Rome LLP

(57) ABSTRACT

The invention relates to an electrical conversion and distribution system for an aircraft, the system comprising a synchronous starter-generator (ENG S/G) intended to be coupled to an aircraft engine, a rectifier (R) capable of transforming alternating voltage into direct voltage, an auxiliary synchronous starter-generator (AUX S/G) intended to be coupled to an auxiliary power group, a first, a second and a third power converter (CV1, CV2, CV3) capable of transforming direct voltage into alternating voltage or vice versa, and at least one battery (BATT).

10 Claims, 3 Drawing Sheets

Figure 1:
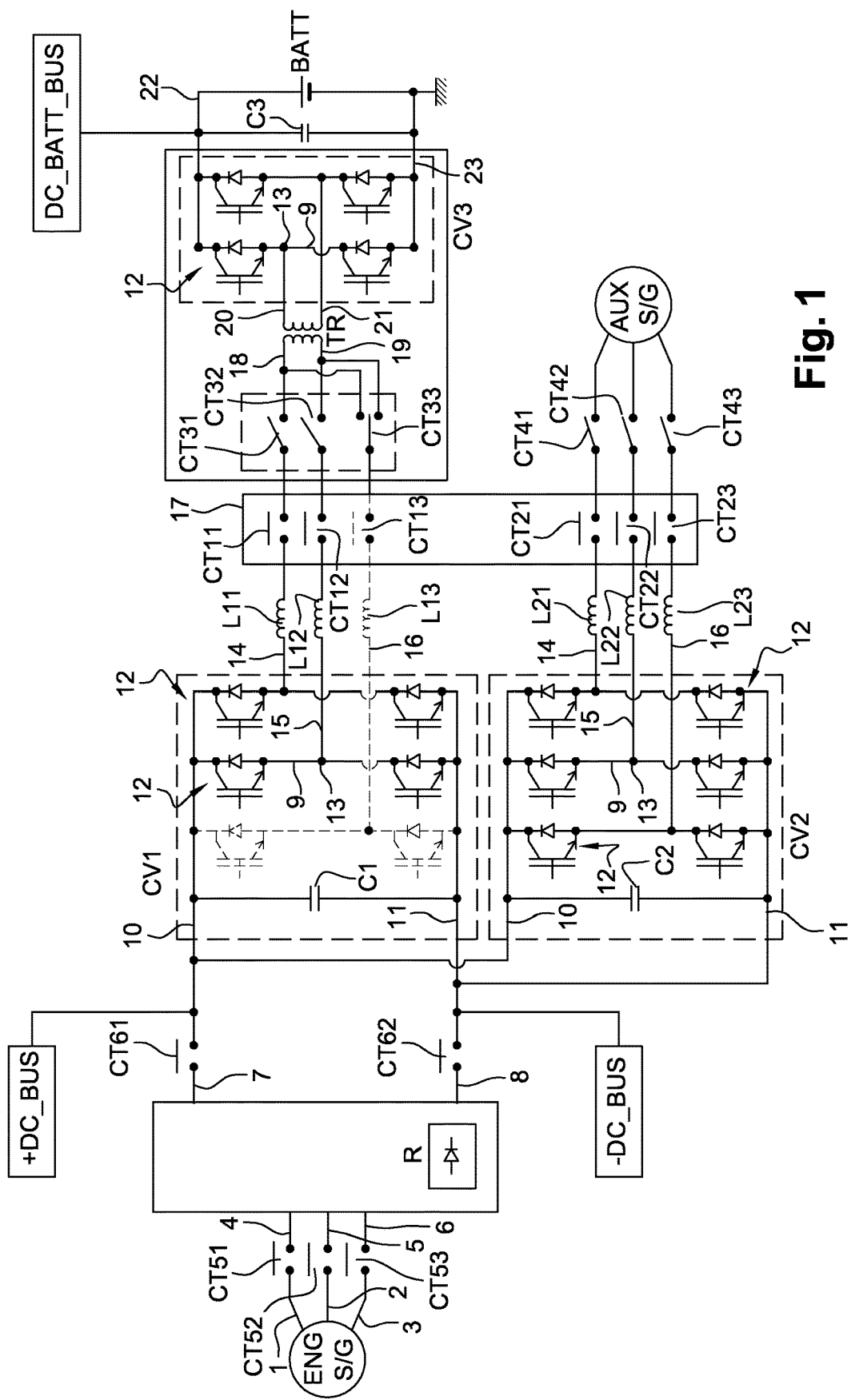

(51) Int. Cl.
*H02J 5/00* (2016.01)
*H02J 7/02* (2016.01)
*H02J 7/14* (2006.01)
*H02J 7/00* (2006.01)

(52) U.S. Cl.
CPC ... *B64D 2221/00* (2013.01); *H02J 2007/0059* (2013.01); *H02J 2007/143* (2013.01)

(56) References Cited

FOREIGN PATENT DOCUMENTS

FR 2 941 107 A1 7/2010
FR 2 990 573 A1 11/2013

\* cited by examiner

ELECTRICAL CONVERSION AND DISTRIBUTION SYSTEM FOR AN AIRCRAFT

The present invention relates to an electrical conversion and distribution system for an aircraft.

The aircraft is for example an air plane wherein non-propulsive systems are mainly supplied with electric power.

The non-propulsive systems in an aircraft are generally supplied by three power networks the power of which is derived from the plane engines or turbojet engines, namely a hydraulic power network, an electric power network and a pneumatic power network.

The hydraulic power network is typically used to supply actuators intended for flight control, landing gear extension and retraction systems, the front wheel guidance and braking systems.

The electric power network is generally used to supply the technical loads such as avionics, lighting, fuel pumps, fans and commercial loads such as the galleys (i.e. the kitchen areas) and the passenger entertainment systems.

Eventually, the pneumatic power is mainly used to supply system for pressurizing and air conditioning the cabin, the system for protecting the wing and nacelle against frost and the engine starting system.

New architectures for non-propulsive systems requiring a larger share of electrical energy have been developed recently. The technological advances in the field of electrical energy conversion offer the capacity of performing all the above functions with systems supplied with electrical power.

Using electrical or electromechanical systems including, among others, power electronics and actuators, has the following advantages.

Such systems are used only when necessary, so that the power draw on the aircraft engines can be optimized. Besides, the maintenance costs of such systems are lower than the maintenance costs of the hydraulic or pneumatic systems.

The main drawback, however, is the generalization of electrical systems with dedicated power electronic elements (dedicated power converters, etc . . . ).

Document FR 2907762 for example discloses an electrical conversion and distribution system for an aircraft, wherein each converter is dedicated to a particular function (supply of a motor-compressor of the air conditioning system, for instance).

Such document also discloses an interface between one or more battery(ies) and power converters. Such interface is specifically provided through a converter of a so-called «Buck Boost Converter Unit» type.

Such interface does not make it possible to ensure the electric starting of an auxiliary synchronous starter-generator intended to be coupled to an auxiliary power unit (or APU).

It thus seems to be necessary to have an electrical conversion and distribution system for an aircraft, making it possible to reduce the number of power electronic elements, such as for example converters, while ensuring maximum functionality within the aircraft.

The invention more particularly aims at providing a simple, efficient and cost-effective solution to this problem.

For this purpose, it provides for an electrical conversion and distribution system for an aircraft, with the system comprising at least one synchronous starter-generator intended to be coupled to an aircraft engine, a rectifier capable of transforming alternating voltage into direct voltage, at least one auxiliary synchronous starter-generator intended to be coupled to an auxiliary power group, at least a first, a second and a third power converters capable of transforming direct voltage into alternating voltage or vice versa, and at least one battery capable of supplying direct voltage, linking and switching means capable of electrically connecting, in a first operating mode, the battery to the auxiliary synchronous starter-generator, through the third power converter, the first power converter and the second power converter successively, with said linking and switching means also being capable of electrically connecting, in a second operating mode, the synchronous starter-generator to the battery, through the rectifier, the first power converter and the third power converter successively.

In the first operating mode, it is thus possible to start the auxiliary power unit using the battery. In an alternative solution, in the first operating mode, the battery can be charged using the auxiliary power unit.

In the second operating mode, the battery can be charged using the engine of the aircraft.

The system may comprise a transformer positioned between the first power converter and the third power converter.

The transformer can then be of the single-phased type and comprise a first and a second input/output terminals and a first and a second output/input terminals.

Besides, the first and second power converters are three-phased and each comprise six switching cells, with each cell comprising a diode and a transistor, for instance, specifically an insulated gate bipolar transistor, with the first and second power converters, each comprising a first and a second input/output terminals, and a first, a second and a third output/input terminals.

The first output/input terminal of the first power converter can then be capable of being connected to the first input/output terminal of the transformer, with the second output/input terminal of the first power converter being capable of being connected to the second input/output terminal of the transformer.

Besides, the third output/input terminal of the first power converter can be capable of being connected to the first input/output terminal of the transformer, to the second input/output terminal of the transformer, or to none of said input/output terminals of the transformer.

This makes it possible to remedy a possible failure of the connection between the first output/input terminal of the first power converter and the first input/output terminal of the transformer, or the connection between the second output/input terminal of the power converter and the second input/output terminal of the transformer.

Advantageously, the first input/output terminal of the first power converter is connected to the first input/output terminal of the second power converter, with the second input/output terminal of the first power converter being connected to the second input/output terminal of the second power converter.

The first and second power converters preferably each comprise three branches connected in parallel at two linking ends, with each branch comprising two switching cells arranged in series and a connection point positioned between the two switching cells, with each output/input terminal of the corresponding power converter being connected to one of said connection points, with each input/output terminal of the corresponding power converter being connected to one of said linking ends.

According to one characteristic of the invention, the third power converter comprises two branches connected in parallel, at two linking ends, with each branch comprising two switching cells arranged in series and a connection point positioned between the two switching cells, with each input/output terminal of the third power converter being connected to one of said connection points, with each output/input terminal of the third power converter being connected to one of said linking ends.

Each output terminal of the transformer is then connected to one of the input/output terminals of the third power converter, with each output/input terminal of the third power converter being connected to one of the two poles of the battery.

Figure 2:
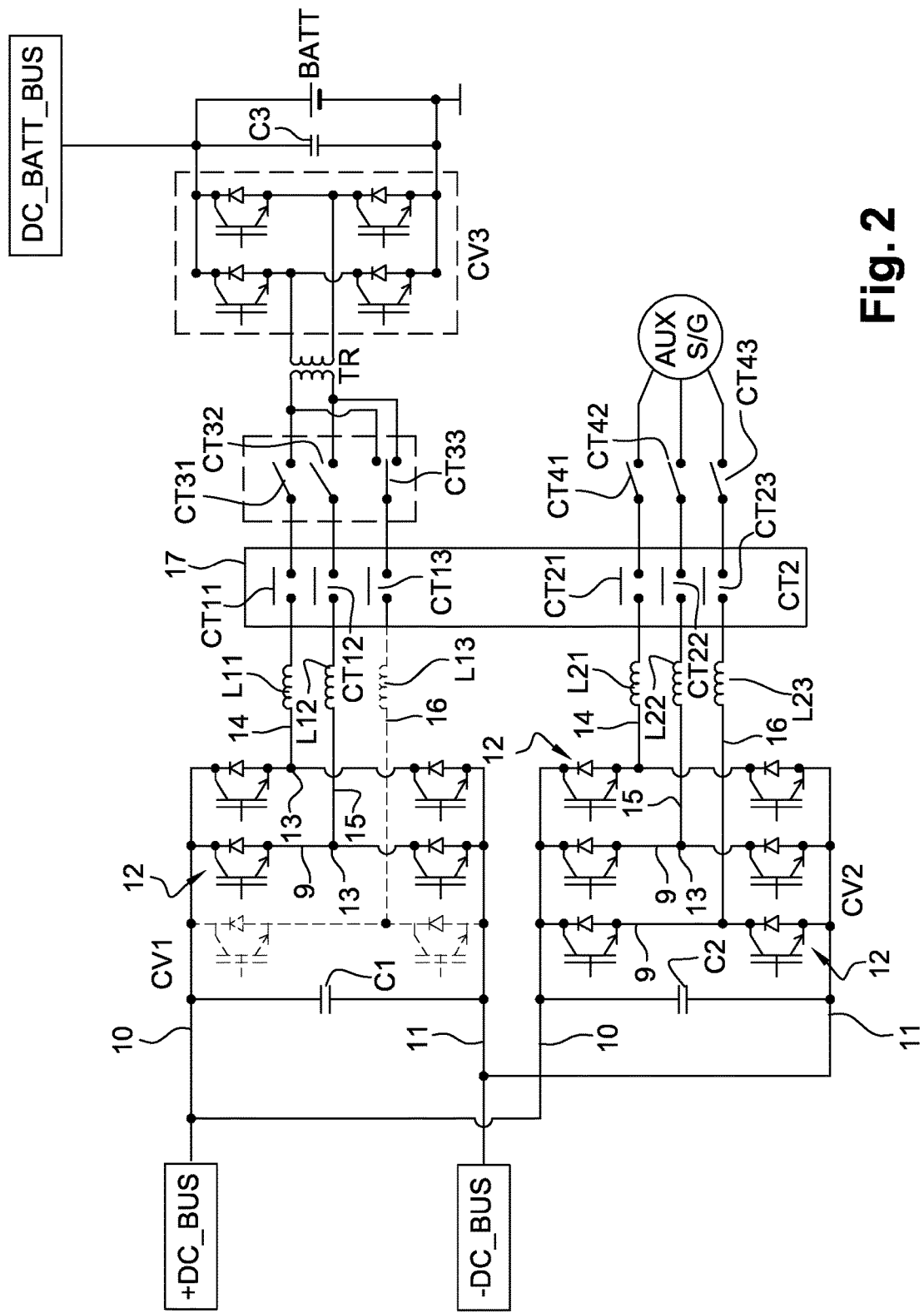
Figure 3:
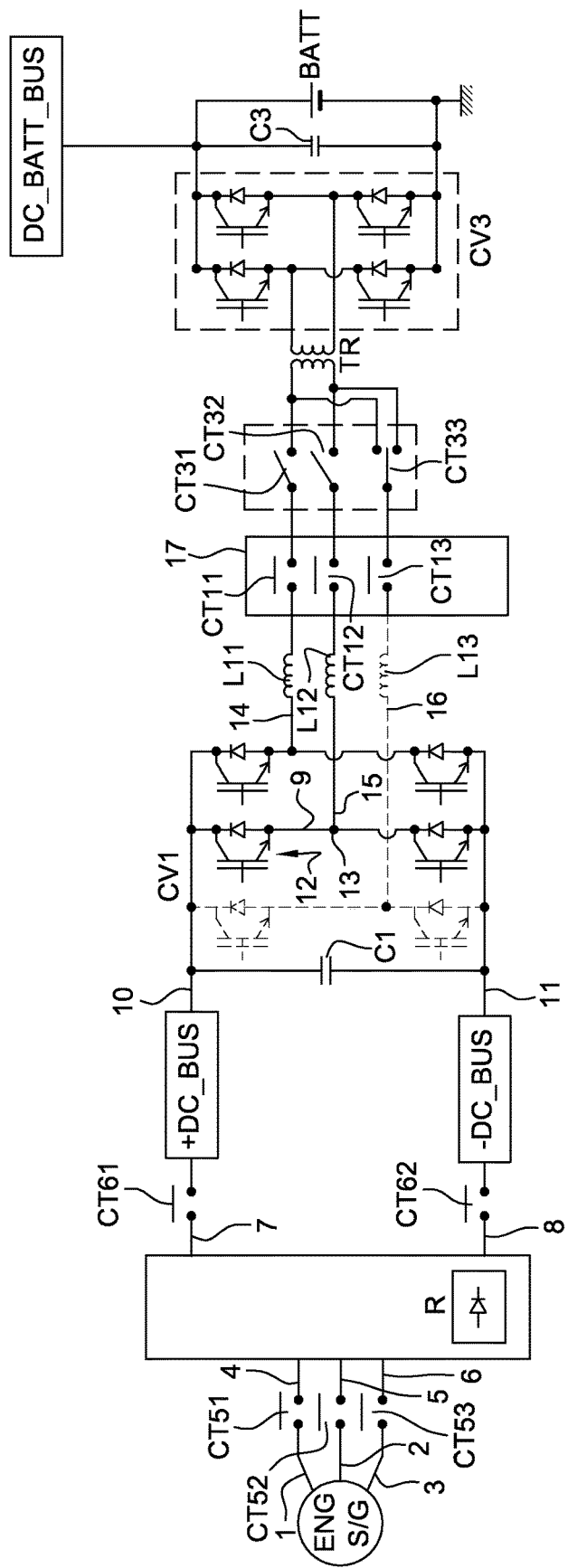

The invention will be better understood, and other details, characteristics and advantages of the invention will appear upon reading the following description given by way of a non-restrictive example while referring to the appended drawings wherein:

FIG. 1 is a schematic view of one embodiment of the system according to the invention, FIG. 2 is a schematic view of a part of the system according to the invention, showing the first operating mode, FIG. 3 is a schematic view of a part of the system according to the invention, showing the second operating mode.

An electrical conversion and distribution system for an aircraft, according to a preferred embodiment is illustrated in FIG. 1.

The aircraft conventionally comprises an engine rotationally coupled to a synchronous starter-generator ENG S/G, and an auxiliary power unit, rotationally coupled to an auxiliary synchronous starter-generator AUX SIG.

Each starter-generator ENG S/G, AUX S/G is a three-phased synchronous machine able either to start the corresponding engine when powered by an alternating voltage (starter mode) or to generate an alternating voltage when the engine is started (generator mode). It should be noted here that, in generator mode, the generated voltage has a variable frequency which depends on the engine rotational speed. The voltage generated is for example 230V or 115V (phase-to-ground voltage) and the frequency ranges for instance from 360 to 800 Hz.

The starter-generator comprises terminals bearing reference numbers 1, 2, 3, connected to inputs 4, 5, 6 of a rectifier R, through contactors CT51, CT52 and CT53 respectively. The rectifier R comprises two outputs bearing reference numbers 7, 8. As already known per se, such a rectifier R makes it possible to transform a three-phased alternating voltage into direct voltage.

The outputs 7, 8 are connected, through contactors CT61 and CT62 respectively, to bus bars +OC BUS and −OC BUS the potential of which is +270V or +135 V for the bar +OC_BUS and −270V or −135V for the bar −OC_BUS respectively. The bar +OC_BUS is also connected to a first input/output terminal of a first power converter CV1 and to a first input/output terminal of a second power converter CV2. The bar +OC_BUS is connected to a second input/output terminal of the first power converter CV1 and to a second input/output terminal of the second power converter CV2.

Each power converter CV1, CV2 is of the single-phase type and is capable of transforming direct voltage into alternating voltage, or vice versa. Each power converter CV1, CV2 specifically comprises three branches 9 connected in parallel, at two linking ends 10, 11 forming the input/output terminals of said converter CV1, CV2, with each branch 9 comprising two switching cells 12 arranged in series and a connection point 13 positioned between the two switching cells 12.

Each switching cell 12 comprises a diode and a transistor, specifically an insulated gate bipolar transistor, as is known per se.

Each power converter comprises three output/input terminals bearing reference numbers 14, 15, 16, with each output/input terminal 14, 15, 16 of the corresponding power converter CV1, CV2 being connected to one of said connection points 13. A capacitor C1, C2 is mounted between the input/output terminals 10, 11 of each converter CV1, CV2.

The output/input terminals 14, 15, 16 of the second power converter CV2 are connected to the three terminals of the auxiliary synchronous starter-generator AUX SIG, through inductors L21, L22, L23, contactors CT21, CT22, CT23 belonging to a switching matrix 17 and contactors CT41, CT42, CT43 respectively.

The output/input terminals 14 et 15 of the first power converter CV1 are connected to input/output terminals 18, 19 of a transformer TR, through inductors L11, L12, contactors CT11, CT12 belonging to the switching matrix 17, and contactors CT31, CT32 respectively. The output/input terminal 16 of the first power converter CV1 can be connected either to the terminal 18, or to the terminal 19 of the transformer TR through an inductor L13, a contactor CT13 belonging to the switching matrix 17, and a contactor CT33. The contactor CT33 specifically has three positions, i.e. a first position making it possible to connect the terminal 16 to the terminal 18, a second position making it possible to connect the terminal 16 to the terminal 19, and a third position making it possible to disconnect the terminal 16 from the terminal 18 and from the terminal 19. The corresponding line can thus be connected to either one of the terminals 18, 19, in case of failure.

The transformer TR makes it possible to provide galvanic isolation and to increase or reduce the alternating voltage between the corresponding terminals of the transformer TR, depending on the transformation ratio.

The output/input terminals 20, 21 of the transformer TR are connected to input/output terminals of a third power converter CV3, with said power converter CV3 being capable of transforming direct voltage into single-phase alternating voltage, or vice versa.

The power converter CV3 is specifically of the single-phased type and comprises two branches 9 connected in parallel, at two linking ends 22, 23, with each branch 9 comprising two switching cells 12 arranged in series and a connection point 13 positioned between the two switching cells 12.

Each input/output terminal 20, 21 of the third power converter CV3 is connected to one of said connection points 13. Besides, each output/input terminal 22, 23 of the third power converter CV3 is connected to one of said linking ends. A capacitor C3 is mounted between the terminals 22 and 23. Similarly, a battery BATT is mounted between the terminals 22 and 23 of the power converter CV3.

A first operating mode of such a system is illustrated in FIG. 2. In such mode, the battery BATT is connected to the auxiliary starter-generator AUX SIG through the third power converter CV3, the transformer TR, the first power converter CV1 and the second power converter CV2.

In such first operating mode, the auxiliary starter-generator AUX SIG and thus the auxiliary power unit coupled thereto, can be started using the battery BATT.

In this operating mode, the starter-generator ENG SIG and the rectifier R are disconnected from the bars +OC BUS and −DC_BUS, and thus from the converters CV1 and CV2. The battery BATT thus becomes the only source of energy supplied to the converters CV1 and CV2. For this purpose, the converter CV3 (also called a Buck Boost Converter), can generate a 400 Hz single-phased alternating voltage, from the direct voltage source formed by the battery BATT. Such alternating voltage is then raised to a voltage of 115V or 230V by the single-phased transformer TR. Frequency remains unchanged at 400 Hz.

It should be noted that the output voltage of the transformer TR can be filtered by a low-pass filter, also called a sine filter or LC filter. Such filter is used for smoothing the waveform voltage fronts in order to obtain a sinusoidal shape. Impedances L11, L12, L13 and L21, L22, L23 may form a part of the low-pass filter.

The converter CV1 is used for rectifying the alternating voltage supplied by the transformer TR.

Two techniques can be used for rectifying the alternating voltage at the converter CV1:

A so-called passive rectification, making it possible to raise the output direct voltage of said converter CV1 to 270V, or 540V for an input alternating voltage of 115V or 230V, respectively. In this case, the diodes of the switching cells 12 only make it possible to rectify voltage.

A so-called active rectification or PFC (Power Factor Correction) making it possible to raise the input alternating voltage to a voltage above 270V, from a output direct voltage of 115V. Therefore, voltage is rectified using the transistors and the diodes of the switching cells 12. Such an active rectification is advantageous in that voltage is rectified by controlling the converter CV1, whatever the power level required by the auxiliary starter-generator AUX S/G. Besides, the power factor (the phase difference between alternating voltage and alternating current) is almost a unity power factor.

The converter CV2 is then used for driving the starting of the auxiliary starter-generator AUX S/G. Such converter CV2 then makes it possible to transform direct voltage into three-phased alternating voltage.

As an alternative solution, in the mode illustrated in FIG. 2, if the auxiliary starter-generator AUX S/G is started, the battery can then be charged. The converter CV2 then transforms the alternating voltage supplied by the auxiliary starter-generator AUX S/G into direct voltage and the converter CV1 transforms such direct voltage into alternating voltage. The alternating voltage supplied at the output of the transformer TR between the terminals 20 and 21 is then transformed into direct voltage, using the converter CV3, with such voltage being applied to the terminals of the battery BATT, so as to charge it.

FIG. 3 illustrates another operating mode wherein the auxiliary starter-generator AUX S/G and the rectifier R are connected to the bars +DC_BUS and −DC_BUS and to the converter CV1 through contactors CT61 and CT62. The battery BATT then forms an electrical charge.

Such operating mode makes it possible to charge the battery BATT, from the starter-generator ENG S/G, i.e. when the engine, which is coupled to the starter-generator ENG S/G, is operating.

In the case of the invention, the power converters CV1 and CV2 may interchangeably be selected among a converter matrix comprising n power converters having identical structures CV1, CV2, . . . CVn. In case of need, the availability of at least one of the matrix converters (with the operating mode of FIG. 3) or at least two matrix converters (with the operating mode of FIG. 2) shall thus be checked. The other matrix converters may be used for supplying electrical charges, as known per se.

The invention claimed is:

1. An electrical conversion and distribution system for an aircraft, with the system comprising a synchronous starter-generator intended to be coupled to an aircraft engine, a rectifier capable of transforming alternating voltage into direct voltage, at least one auxiliary synchronous starter-generator intended to be coupled to an auxiliary power group, at least a first, a second and a third power converter each one being capable of transforming direct voltage into alternating voltage or vice versa, at least one battery capable of supplying direct voltage, linking and switching means capable of electrically connecting, in a first operating mode, the battery to the auxiliary synchronous starter-generator, through the third power converter, the first power converter and the second power converter successively, with said linking and switching means also being capable of electrically connecting, in a second operating mode, the synchronous starter-generator to the battery, through the rectifier, the first power converter and the third power converter successively.

2. A system according to claim 1, further comprising a transformer positioned between the first power converter and the third power converter.

3. A system according to claim 2, wherein the transformer is single-phased and comprise a first and a second input/output terminals and a first and a second output/input terminals.

4. A system according to claim 3, wherein the first and second power converters are three-phased and each comprise six switching cells, with each cell comprising a diode and a transistor, for instance, specifically an insulated gate bipolar transistor, with the first and second power converters each comprising a first and a second input/output terminals, and a third and a fourth output/input terminal.

5. A system according to claim 4, wherein the first output/input terminal of the first power converter is capable of being connected to the first input/output terminal of the transformer, with the second output/input terminal of the first power converter being capable of being connected to the second input/output terminal of the transformer.

6. A system according to claim 5, wherein the third output/input terminal of the first power converter is capable of being connected to the first input/output terminal of the transformer, to the second input/output terminal of the transformer, or to none of said input/output terminals of the transformer.

7. A system according to claim 4, wherein the first input/output terminal of the first power converter is connected to the first input/output terminal of the second power converter, with the second input/output terminal of the first power converter being connected to the second input/output terminal of the second power converter.

8. A system according to claim 4, wherein the first and second power converters each comprise three branches connected in parallel at two linking ends, with each branch comprising two switching cells arranged in series and a connection point positioned between the two switching cells, with each output/input terminal of the corresponding power converter being connected to one of said connection point, and with each input/output terminal of the corresponding power converter being connected to one of said linking ends.

9. A system according to claim 4, wherein the third power converter comprises two branches connected in parallel, at two linking ends, with each branch comprising two switching cells arranged in series and a connection point positioned between the two switching cells, with each input/output terminal of the third power converter being connected to one of said connection points, and with each output/input terminal of the third power converter being connected to one of said linking ends.

10. A system according to claim 9, wherein each output terminal of the transformer is connected to one of the input/output terminals of the third power converter, with each output/input terminal of the third power converter being connected to one of the two poles of the battery.

* * * * *